United States Patent
Callaway et al.

(10) Patent No.: US 9,298,637 B2
(45) Date of Patent: Mar. 29, 2016

(54) DYNAMIC CACHING MODULE SELECTION FOR OPTIMIZED DATA DEDUPLICATION

(71) Applicant: International Business Machines Corporation, Armonk, NY (US)

(72) Inventors: Robert D. Callaway, Holly Springs, NC (US); Ioannis Papapanagiotou, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 13/800,289

(22) Filed: Mar. 13, 2013

(65) Prior Publication Data

US 2014/0281258 A1  Sep. 18, 2014

(51) Int. Cl.
*G06F 12/08* (2006.01)

(52) U.S. Cl.
CPC ........ *G06F 12/0891* (2013.01); *G06F 12/0871* (2013.01); *G06F 2212/264* (2013.01); *G06F 2212/283* (2013.01)

(58) Field of Classification Search
CPC .......................... G06F 12/0891; G06F 12/0871
See application file for complete search history.

(56) References Cited

U.S. PATENT DOCUMENTS

| | | | |
|---|---|---|---|
| 8,086,799 B2 | 12/2011 | Mondal et al. | |
| 2009/0182789 A1 | 7/2009 | Sandorfi et al. | |
| 2011/0228674 A1* | 9/2011 | Pais et al. | 370/235 |
| 2013/0265869 A1* | 10/2013 | Zhang et al. | 370/229 |
| 2014/0281262 A1* | 9/2014 | Callaway et al. | 711/135 |

OTHER PUBLICATIONS

Papapanagiotou et al., "Chunk and Object Level Deduplication for Web Optimization: A Hybrid Approach," International Communications Conference (ICC), 2012 IEEE, Jun. 2012.

* cited by examiner

*Primary Examiner* — Edward Dudek, Jr.
(74) *Attorney, Agent, or Firm* — Steven M. Greenberg, Esq.; CRGO Law

(57) ABSTRACT

Embodiments of the invention provide a method, system and computer program product for dynamic caching module selection for optimized data deduplication. In an embodiment of the invention, a method for dynamic caching module selection for optimized data deduplication is provided. The method includes receiving a request to retrieve data and classifying the request. The method also includes identifying from amongst multiple different caching modules each with a different configuration a particular caching module associated with the classification of the request. Finally, the method includes deduplicating the data in the identified caching module.

16 Claims, 2 Drawing Sheets

US 9,298,637 B2

DYNAMIC CACHING MODULE SELECTION FOR OPTIMIZED DATA DEDUPLICATION

BACKGROUND OF THE INVENTION

1. Field of the Invention

The present invention relates to data deduplication and more particularly to data deduplication through byte caching.

2. Description of the Related Art

Data deduplication refers to the reduction of a data flow through the elimination of redundancies in data. The act of data deduplication can reduce the quantity of traffic transmitted across a communications channel thereby increasing the responsiveness of communications between network entities exchanging data over the communications channel. Data deduplication can be performed technically in several different ways including data compression, delta encoding, proxy caching and data redundancy elimination.

Data compression removes redundant content on a per-object basis by representing duplicate bytes with hash values. In delta encoding, a technique applicable only to Web based objects, similar portions of a Web object can be represented with a hash value. Proxy caching, like data compression and delta encoding, is an object based method that performs object level deduplication by storing an object that may potentially be referenced later. Data redundancy elimination, also referred to as byte caching, differs from data compression, delta encoding and proxy caching in that byte caching operates at the byte level and is not limited only to Web objects and the hypertext transfer protocol (HTTP).

In byte caching, a combination of an encoder and decoder act in concert over a sideband channel to identify within the encoder regions of repeated bytes within byte streams and to replace these regions with hash values only to be reconstituted as a full byte stream at the decoder. The precision afforded by byte caching can provide the most effective form of deduplication, but not without substantial computational and resource cost.

Specifically, the use of byte caching as middleware in a data processing system can result in undesirable excessive memory utilization, and overutilization of processing cycles creating a bottleneck of throughput at the point of byte caching. Further, to the extent that byte caching relies upon proper fingerprint size selection which can vary in effectiveness for data from different application sources, the utilization of byte caching for data flows of different applications can be effective only for some applications and not others. Finally, much of the effectiveness of byte caching is mitigated through the inefficiency of byte caching upon byte streams lacking redundancy such as encrypted byte streams.

BRIEF SUMMARY OF THE INVENTION

Embodiments of the present invention address deficiencies of the art in respect to byte caching for data deduplication and provide a novel and non-obvious method, system and computer program product for dynamic caching module selection for optimized data deduplication. In an embodiment of the invention, a method for dynamic caching module selection for optimized data deduplication is provided. The method includes receiving a request to retrieve data and classifying the request. The method also includes identifying from amongst multiple different caching modules each with a different configuration a particular caching module associated with the classification of the request. Finally, the method includes deduplicating the data in the identified caching module.

In one aspect of the embodiment, the request is classified according to a table correlating different requests for different ones of the caching modules, for example a table correlates a protocol and network address for each of the different requests with a corresponding one of the caching modules. The table can include entries determined by processing training data for each of the different requests in each of the caching modules and correlating each of the different requests with an optimal one of the modules. In another aspect of the embodiment, the caching modules include byte caching modules each configured with a different fingerprint size. In yet another aspect of the embodiment, the caching modules additionally include an object caching module. In even yet another aspect of the embodiment, deduplication of the data is bypassed when the request indicates that data is encrypted.

In another embodiment of the invention, a data deduplication data processing system is configured for dynamic caching module selection for optimized data deduplication. The system includes a server farm communicatively coupled to different client computers over a computer communications network and middleware disposed between the server farm and the client computers and executing in memory of a host computer. The middleware includes different caching modules, each caching module having a different configuration. Finally, the system includes a scheduler that includes program code executing in the memory of the host computer and enabled to classify a request to retrieve data from the server farm, to identify from amongst the different caching modules a particular caching module associated with the classification of the request, and to route the data for deduplication in the identified caching module.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamic caching module selection for optimized data deduplication. In accordance with an embodiment of the invention, an inbound byte stream can be classified and compared to a table of pre-determined classifications correlating specific classifications to differently configured byte stream caches with different fingerprint sizes. A particular one of the byte stream caches can be selected according to the classification of the inbound byte stream and the table and the byte stream can be routed for deduplication in the selected byte stream cache. Optionally, a proxy cache can be included in the table as well such that byte streams of a particular classification can routed to the proxy cache for deduplication. As a further option, deduplication can be bypassed entirely for particular classified byte streams such as encrypted byte streams.

Figure 1:
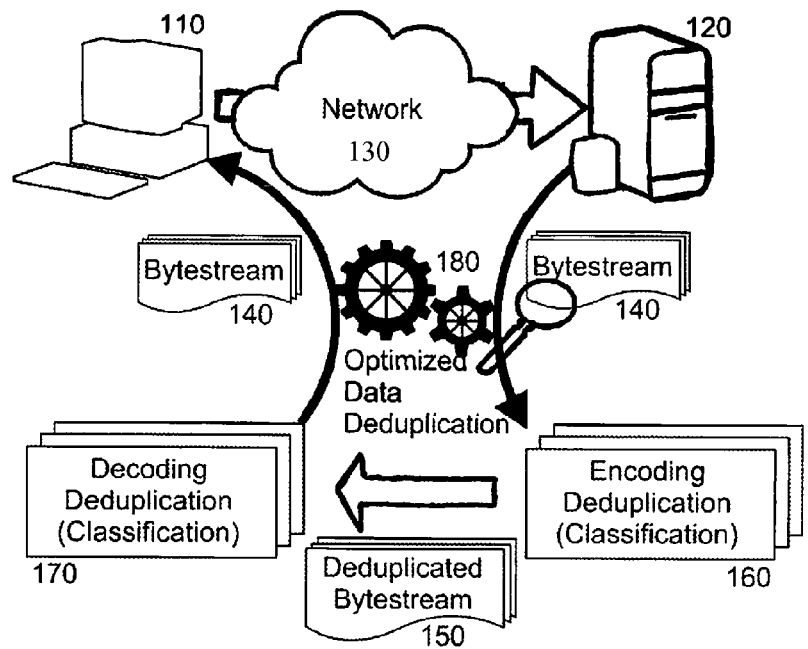
FIG. 1 is a pictorial illustration of a process for dynamic caching module selection for optimized data deduplication.

In further illustration, FIG. 1 pictorially shows a process for dynamic caching module selection for optimized data deduplication. As shown in FIG. 1, a data source 120 can respond to a data request from client 110 over network 130 by locating a requested byte stream 140. Optimized data deduplication logic 180 can classify the byte stream 140, for example in terms of a consuming application in the client 110, an address of the consuming application in the client 110, and a port in the client 110 through which the consuming application is accessed.

Thereafter, the optimized data deduplication logic 180 can select a particular one of several differently configured encoding deduplication modules 160 associated with the classification to perform byte caching on the byte stream 140. The resulting byte caching can generate a deduplicated byte stream 150 that is provided over a sideband channel to a corresponding one of several differently configured decoding deduplication modules 170. Finally, the corresponding one of the decoding deduplication modules 170 can act upon the deduplicated byte stream 150 to regenerate the byte stream 140 for delivery to the client 110.

Figure 2:
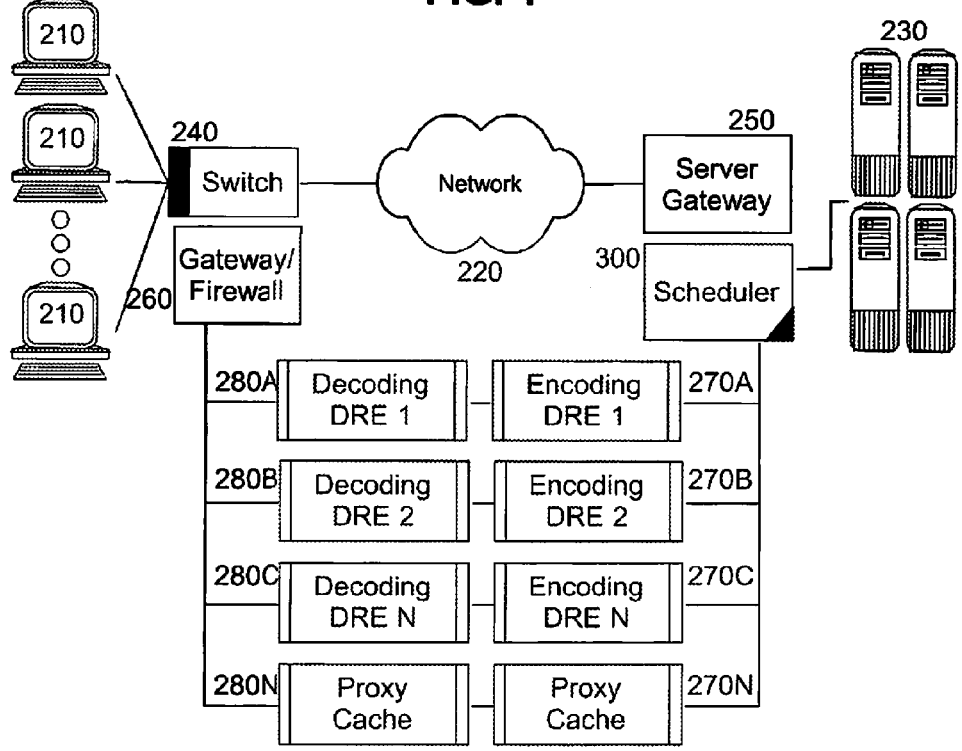
FIG. 2 is a schematic illustration of a data deduplication data processing system configured for dynamic caching module selection for optimized data deduplication; and, FIG. 3 is a flow chart illustrating a process for dynamic caching module selection for optimized data deduplication.

The process described in connection with FIG. 1 can be implemented within a data deduplication data processing system. In yet further illustration, FIG. 2 schematically shows a data deduplication data processing system configured for dynamic caching module selection for optimized data deduplication. The system can include a server farm 230 including data storage that manages the storage and retrieval of data from data storage across one or more server computers and communicatively coupled to data consuming clients 210 by way of a computer communications network 220 through a server gateway 250. Of note, optimized data deduplication middleware can be disposed between the server farm 230 and the clients 210.

The middleware can include multiple different encoding caching modules 270A, 270B, 270C each executing in the memory of a host computer and communicatively linked to corresponding decoding caching modules 280A, 280B, 280C. The middleware also can include a proxy cache 270N, 280N configured to act upon Web objects. Finally, each pair of the encoding and decoding caching modules 270A, 280A, 270B, 280B, 270C, 280C can be a byte cache configured differently according to different fingerprint sizes. Each of the encoding caching modules 270A, 270B, 270C can share the same memory space. Of import, a scheduler 300 can execute in memory of a host computer coupled to the server gateway 250. The scheduler 300 can include program code enabled to classify a request for data in the server farm 230 by an application in one of the clients 210.

The program code of the scheduler 300 further can be enabled to select one of the encoding caching modules 270A, 270B, 270C to perform data deduplication (or the proxy cache 270N, 280N) based upon the classification of the request for data. In this regard, in one aspect of the embodiment, the scheduler 300 can consult a table correlating different classifications with different ones of the encoding caching modules 270A, 270B, 270C. The classification can include, for example, an identity of an application associated with the request, a network address of the application, a port for communicating with the application, or any combination thereof.

The table itself can be constructed according to training data submitted to each of the encoding caching modules 270A, 270B, 270C from different servers according to different protocols. The performance metrics of each of the encoding caching modules 270A, 270B, 270C can be monitored and measured, for example, for throughput, processor and memory utilization and response time, to name only a few examples. The measured metrics can be submitted to a performance function, for example a function that weights different metrics for the utilization of different resources and then sums the weighted outcomes into an aggregated metric. The aggregate metric for a particular training data set can be compared against other aggregate metrics for the same training data set in different ones of the encoding caching modules 270A, 270B, 270C. In this way, the table can be constructed with an optimal one of the encoding caching modules 270A, 270B, 270C corresponding to a classification for the training data. Optionally, the performance of the encoding caching modules 270A, 270B, 270C can be monitored and fed back to the scheduler 300 so that the table can be adapted according to the monitored performance of the encoding caching modules 270A, 270B, 270C.

Once the scheduler 300 has selected a particular one of the encoding caching modules 270A, 270B, 270C, a byte stream of requested data by an application in a requesting one of the clients 210 can be deduplicated by the selected one of the encoding caching modules 270A, 270B, 270C and transmitted over a sideband channel to a corresponding one of the decoding caching modules 280A, 280B, 280C. The corresponding one of the decoding caching modules 280A, 280B, 280C can reconstitute the deduplicated byte stream and can transmit the reconstituted byte stream to the requesting application through gateway/firewall 260 by way of switch 240.

Figure 3:
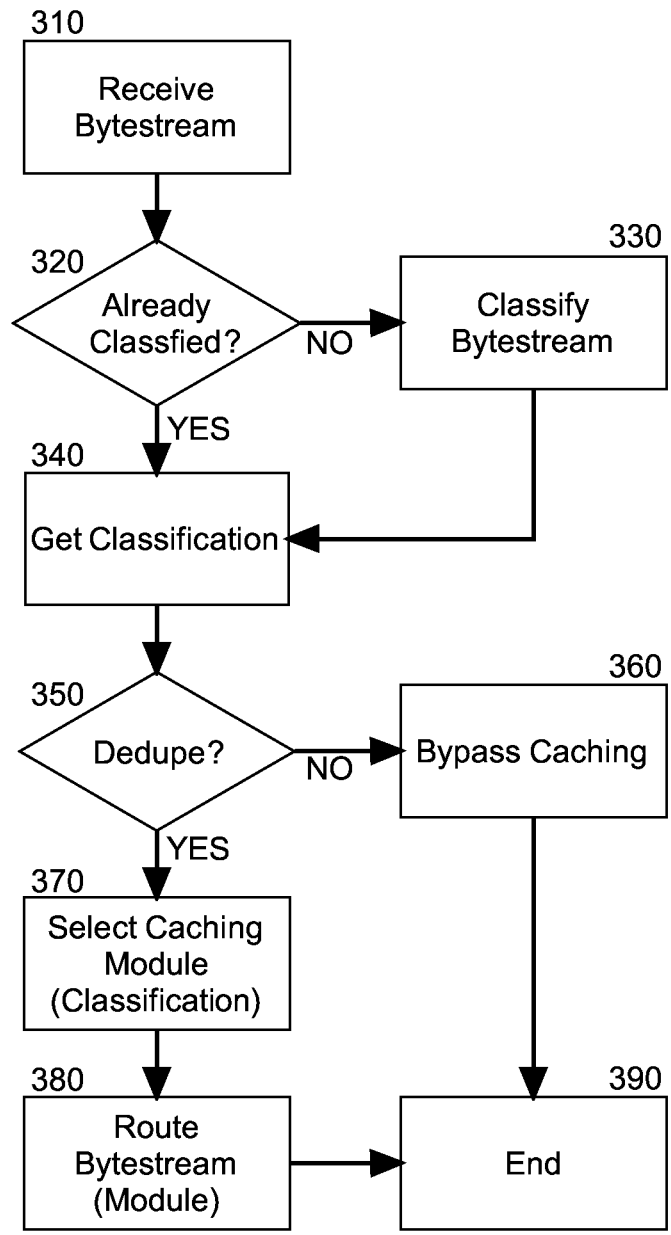

In even yet further illustration of the operation of the scheduler 300, FIG. 3 is a flow chart illustrating a process for dynamic caching module selection for optimized data deduplication. Beginning in block 310, a byte stream can be received from a server farm for delivery to a requesting application over a computer communications network. In decision block 320, it can be determined whether or not the requested byte stream already had been classified by the scheduler. If not, in block 330 the byte stream can be classified in accordance with a protocol utilized to transmit the request, a server address of a server transmitting the address and a port of the server associated with a requesting application. Thereafter, the classification can be returned to the scheduler in block 340.

In decision block 350, it can be determined whether or not the byte stream is to be deduplicated. In this regard, if the classification indicates that the protocol of the request does not lend itself to efficient deduplication, in block 360, caching can be bypassed and the process can end in block 390. Otherwise, in block 370 a particular caching module can be selected according to the classification and in block 380, the byte stream can be routed to the selected caching module. Finally, the process can end in block 390.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A data deduplication data processing system configured for dynamic caching module selection for optimized data deduplication, the system comprising:
   a server communicatively coupled to a data store and plurality of client computers over a computer communications network;
   middleware disposed between the server and the plurality of client computers and executing in memory of a host computer, the middleware comprising a plurality of different caching modules, each different caching module having a different configuration and ones of the plurality of different caching modules comprising program code enabled to deduplicate data in an identified particular caching module; and
   a scheduler comprising program code executing in memory of a host computer and enabled to classify a request to retrieve data from the data store of the server, to according to table including entries determined by processing training data for each of the different request in each of the plurality of different caching modules and correlating each of the different requests with an optimal one of the plurality of different modules, to identify, from amongst the different caching modules, a particular caching module associated with the classification of the request, and to route the data for deduplication in the identified caching module.

2. The system of claim 1, wherein the plurality of different caching modules include byte caching modules each byte caching module configured with a different fingerprint size.

3. The system of claim 2, wherein the byte caching modules additionally include an object caching module.

4. The system of claim 3, wherein the object caching module compresses objects.

5. The system of claim 1, wherein the table correlates a protocol and network address for each of the different requests with a corresponding one of the plurality of different caching modules.

6. The system of claim 1, wherein the program code of the scheduler bypasses deduplication of the data responsive to an indication in the scheduler to bypass deduplication of the data referenced by the request.

7. The system of claim 1, wherein the table is constructed by:
   submitting the training data to each of the plurality of different modules from different servers according to different protocols,
   monitoring performance metrics of each of the plurality of different modules and measuring the performance for throughput, processor and memory utilization and response time,
   submitting the measured metrics to a performance function that weights different metrics for utilization of different resources and then sums the weighted metrics into an aggregated metric,
   comparing the aggregate metric for a particular training data set against other aggregate metrics for the training data set in different ones of the modules, and
   selecting an optimal one of the plurality of different modules corresponding to a classification for the training data.

8. The system of claim 1, wherein each of the plurality of different caching module comprises an encoding caching module comprising program code to perform data deduplication and also a corresponding decoding caching module comprising program code to reconstitute data after data deduplication.

9. A computer program product for dynamic caching module selection for optimized data deduplication, the computer program product comprising:
   a non-transitory computer readable storage medium having computer readable program code embodied therewith, the computer readable program code comprising:
   computer readable program code for receiving a request to retrieve data;
   computer readable program code for classifying the request;
   computer readable program code for identifying from amongst multiple different caching modules, each multiple different caching module with a different configuration, a particular caching module associated with the classification of the request; and,
   computer readable program code for deduplicating the data in the identified particular caching module, but bypassing the deduplication of the data when the request indicates that data is encrypted.

10. The computer program product of claim 9, wherein the request is classified according to a table correlating different requests to different ones of the multiple different caching modules.

11. The computer program product of claim 10, wherein the table correlates a protocol and network address for each of the different requests with a corresponding one of the different caching modules.

12. The computer program product of claim 10, wherein the table includes entries determined by processing training data for each of the different requests in each of multiple different caching modules and correlating each of the different requests with an optimal one of the multiple different caching modules.

13. The computer program product of claim 12, further comprising computer readable program code for constructing the table by:
   submitting the training data to each of the multiple different caching modules from different servers according to different protocols,
   monitoring performance metrics of each of the multiple different caching modules and measuring the performance for throughput, processor and memory utilization and response time,
   submitting the measured metrics to a performance function that weights different metrics for utilization of different resources and then sums the weighted metrics into an aggregated metric,
   comparing the aggregate metric for a particular training data set against other aggregate metrics for the training data set in different ones of the multiple different caching modules, and
   selecting an optimal one of the multiple different caching modules corresponding to a classification for the training data.

14. The computer program product of claim 9, wherein the multiple different caching modules include byte caching modules, each byte caching module configured with a different fingerprint size.

15. The computer program product of claim 14, wherein the byte caching modules additionally include an object caching module.

16. The computer program product of claim 9, wherein each of the multiple different caching modules comprises an encoding caching module enabled to perform data deduplication and also a corresponding decoding caching module enabled to reconstitute data after data deduplication.

\* \* \* \* \*